Dec. 30, 1958 R. A. CUMMINGS 2,866,658
DEVICE FOR ADJUSTING THE LENGTH OF A VALVE STEM
Filed Dec. 29, 1955
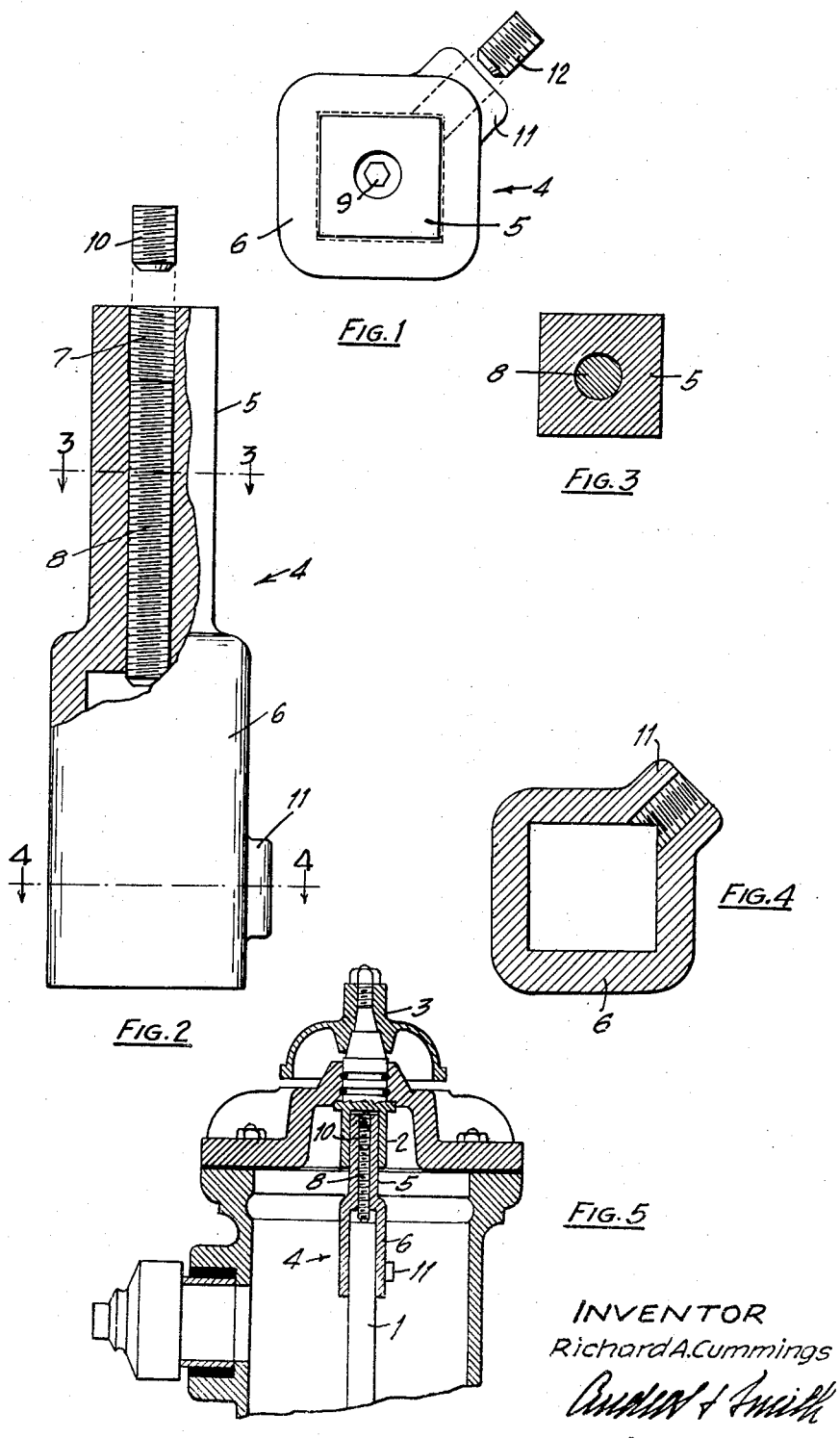
INVENTOR
Richard A. Cummings
ATTORNEYS

United States Patent Office 2,866,658
Patented Dec. 30, 1958

2,866,658

DEVICE FOR ADJUSTING THE LENGTH OF A VALVE STEM

Richard A. Cummings, Troy, N. Y., assignor to The Ludlow Valve Manufacturing Co., Inc., Troy, N. Y., a corporation of New York Application December 29, 1955, Serial No. 556,249

4 Claims. (Cl. 287—58)

My invention relates to valves, and particularly to a device for adjusting the length of the valve stem in a hydrant or other valve having a non-rising stem.

It is often necessary for the valve manufacturer to furnish a customer with a new valve stem. Because clearances are important, it is the present practice to ship a replacement stem which is longer than can be installed. This requires careful measurements by the customer and the cutting of the new stem to the proper length.

The principal object of my invention is to eleminate the necessity of such measurements and the cutting of the replacement valve stems by providing a device of the character described below and illustrated in the accompanying drawing by means of which the effective length of the valve stem of a hydrant or other valve may be properly adjusted.

Referring to the drawing:

Fig. 1 is a top plan view of my device showing one of the lock screws removed;

Fig. 2 is a front elevation of the device with portions broken away and portions in section, and showing the other lock screw removed;

Fig. 3 is a section of Fig. 2 in the plane 3—3;

Fig. 4 is a section of Fig. 2 in the plane 4—4; and

Fig. 5 is a small scale view showing the application of my device to the stem of a hydrant.

In the drawing 1 is the valve stem which is shown as square in cross-section and which ordinarily would fit in the socket 2 to which the umbrella nut 3 is secured.

My device, which is represented generally by the numeral 4, comprises an upper portion 5 which is shown as square in cross-section and substantially the same size as the valve stem 1, and which is adapted to fit in the sleeve or socket 2 as shown in Fig. 5. The lower portion 6 is hollow and adapted closely to engage the valve stem 1 as shown in Fig. 5. In order to adjust the over-all height of the device, the portion 5 is internally threaded as shown at 7 to receive a long adjusting screw 8 having a recess 9 in the top thereof to receive a tool for turning the screw 8.

In order to lock the screw 8 in adjusted position, I provide a lock screw 10 having a similar recess in the top thereof for turning it into the threaded passage in the part 5 until it bears against the top of the adjusting screw 8; and to lock the device to the valve stem 1, the portion 6 is provided with a boss 11 which is internally threaded to receive the lock screw 12 which is similar to the lock screw 10.

While I have illustrated and described my device as having an upper portion which is square in exterior cross-section and a lower portion which is hollow and square in its inside cross-section, it is to be understood that the particular shape of these sections is not important so long as the upper portion can be received and held in the socket 2 in non-rotatable relation therewith, and the lower portion is adapted to receive and hold the valve stem in non-rotatable relation therewith.

What I claim is:

1. A device adapted to connect the umbrella nut of a hydrant having a sleeve depending from said nut which is substantially spaced from the upper end of the stem of said hydrant which is of the non-rising type; said device comprising an elongated metal body having in the lower portion thereof a deep socket having an internal cross section adapted to receive and hold the upper end of said stem in axially slidable but non-rotatable relation therewith, and a longitudinally extending upper portion having an external cross section receivable in the sleeve depending from said nut in axially slidable but non-rotatable relation therewith; said longitudinally extending upper portion having an internally threaded passage, open at the top thereof and extending to said socket; and a screw in said passage provided with means at the top thereof adapted to cooperate a tool for turning said screw into contact with the top of the said stem, when said stem is in said socket, for adjusting the overall effective length of said device.

2. The device set forth in claim 1 having a first lock screw adapted to cooperate with said stem when said stem is in said socket; and a second lock screw in said threaded passage adapted to cooperate with the upper end of the screw in said passage for locking it in adjusted position.

3. The combination with a valve having a stem of the non-rising type which is substantially square in cross section and a first sleeve spaced from the upper end of said stem which is substantially square in cross section and provided with external means for turning it; of means operatively connecting said sleeve and said stem comprising an elongated element having a socket in the lower portion thereof extending around the upper end portion of said stem in non-rotatable relation therewith, and an upper portion positioned in said sleeve in non-rotatable relation therewith; said upper portion having a threaded passage extending from the top thereof to said socket; and an elongated screw in said passage having its lower end in contact with the end of said stem in said socket.

4. The structure set forth in claim 3 having a first lock screw cooperating with the portion of said stem in said socket, and a second lock screw cooperating with the upper end of the screw in said passage for locking it in contact with the end of said stem.

References Cited in the file of this patent

UNITED STATES PATENTS

| | | |
|---|---|---|
| 400,944 | Powell | Apr. 9, 1889 |
| 905,172 | Godson | Dec. 1, 1908 |
| 1,360,340 | Wetzler | Nov. 30, 1920 |
| 2,336,044 | Stuart | Dec. 7, 1943 |